(12) United States Patent
Park et al.

(10) Patent No.: US 10,051,615 B2
(45) Date of Patent: Aug. 14, 2018

(54) METHOD FOR RECEIVING OR TRANSMITTING DOWNLINK CONTROL SIGNAL IN WIRELESS COMMUNICATION SYSTEM AND DEVICE FOR SAME

(71) Applicant: LG ELECTRONICS INC., Seoul (KR)

(72) Inventors: Jonghyun Park, Anyang-si (KR); Hanbyul Seo, Anyang-si (KR); Kijun Kim, Anyang-si (KR); Hyungtae Kim, Anyang-si (KR); Eunsun Kim, Anyang-si (KR); Hanjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 14/430,087

(22) PCT Filed: Sep. 23, 2013

(86) PCT No.: PCT/KR2013/008478
§ 371 (c)(1),
(2) Date: Mar. 20, 2015

(87) PCT Pub. No.: WO2014/046498
PCT Pub. Date: Mar. 27, 2014

(65) Prior Publication Data
US 2015/0249973 A1 Sep. 3, 2015

Related U.S. Application Data

(60) Provisional application No. 61/704,552, filed on Sep. 23, 2012, provisional application No. 61/720,381,
(Continued)

(51) Int. Cl.
*H04W 72/04* (2009.01)
*H04L 5/00* (2006.01)
*H04B 7/024* (2017.01)

(52) U.S. Cl.
CPC ........... *H04W 72/042* (2013.01); *H04L 5/001* (2013.01); *H04L 5/0035* (2013.01);
(Continued)

(58) Field of Classification Search
CPC ....... H04B 7/024; H04L 5/001; H04L 5/0035; H04L 5/0048; H04L 5/0053; H04W 72/042
(Continued)

(56) References Cited

U.S. PATENT DOCUMENTS

| 9,480,031 B2* | 10/2016 | Kazmi | H04W 28/18 |
| 2013/0343317 A1* | 12/2013 | Etemad | H04B 7/024 |
| | | | 370/329 |
| 2015/0003346 A1* | 1/2015 | Kim | H04L 5/001 |
| | | | 370/329 |

FOREIGN PATENT DOCUMENTS

WO  WO 2012/096394 A1  7/2012

OTHER PUBLICATIONS

R1-123589, 3GPP TSG-RAN WG1 Meeting #70 Qingdao, China, Aug. 13-17, 2012 R1-123589 Agenda item: 7.7 Source: Renesas Mobile Europe Ltd Title: Document for: Remaining issues on quasi-colocated antenna ports Discussion and Decision.*
(Continued)

*Primary Examiner* — Huy D Vu
*Assistant Examiner* — Nizam Ahmed
(74) *Attorney, Agent, or Firm* — Birch, Stewart, Kolasch & Birch, LLP

(57) ABSTRACT

A method by which a user equipment receives a downlink control signal in a wireless communication system support-
(Continued)

ing carrier aggregation (CA) and coordinated multiple-point transmission and reception (CoMP), according to one embodiment of the present invention, comprises the steps of: receiving candidate sets of control information for the CA and the CoMP from a downlink serving base stations; and receiving an indicator for indicating one of the candidate sets from the downlink serving base station, wherein the candidate sets of the control information comprise a usable set of control information with respect to each carrier wave, and the control information can include information on carrier waves scheduled by the downlink serving base station, information on channel state information-reference signal antenna port(s) that is (are) quasi co-located (QCL) assumable with demodulation-reference signal antenna port(s) of the downlink serving base station, information on PDCH resource element (RE) mapping and/or information indicating whether or not QCL assumption between the channel state information-reference signal antenna port(s) and antenna port(s) indicated by the information on PDSCH RE mapping is possible.

5 Claims, 10 Drawing Sheets

Related U.S. Application Data filed on Oct. 30, 2012, provisional application No. 61/721,011, filed on Oct. 31, 2012.

(52) U.S. Cl.
CPC .......... *H04L 5/0048* (2013.01); *H04L 5/0053* (2013.01); *H04B 7/024* (2013.01)

(58) Field of Classification Search
USPC .......................................................... 370/329
See application file for complete search history.

(56) References Cited

OTHER PUBLICATIONS

Intel Corporation, "Remaining issues of antenna ports quasi co-location definition," 3GPP TSG-RAN WG1 #70, R1-123425, Qingdao, China, Aug. 13-17, 2012, pp. 1-7.
New Postcom, "Discussions on quasi-co-located antenna ports," 3GPP TSG RAN WG1 Meeting #70, R1-123440, Qingdao, China, Aug. 13-17, 2012, pp. 1-3.
Renesas Mobile Europe LTD, "Remaining issues on quasi-colocated antenna ports," 3GPP TSG-RAN WG1 Meeting #70, R1-123589, Qingdao, China, Aug. 13-17, 2012, pp. 1-6.
Samsung, "Remaining issues on quasi co-location of antenna ports," 3GPP TSG-RAN WG1 #70 meeting, R1-123855, Qingdao, China, Aug. 13-17, 2012, pp. 1-8.

* cited by examiner

FIG. 6
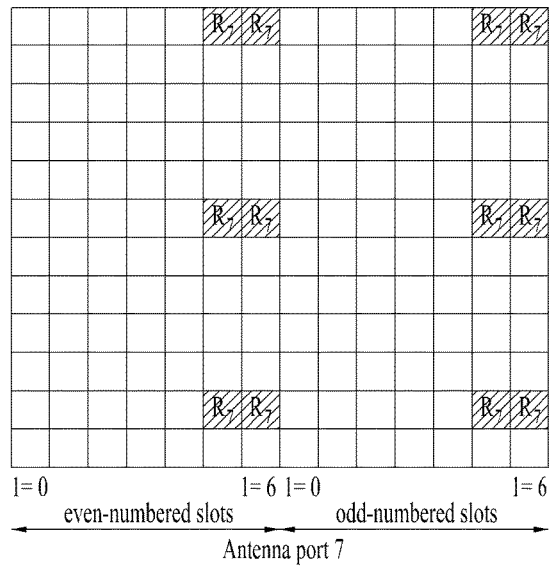
Antenna port 7
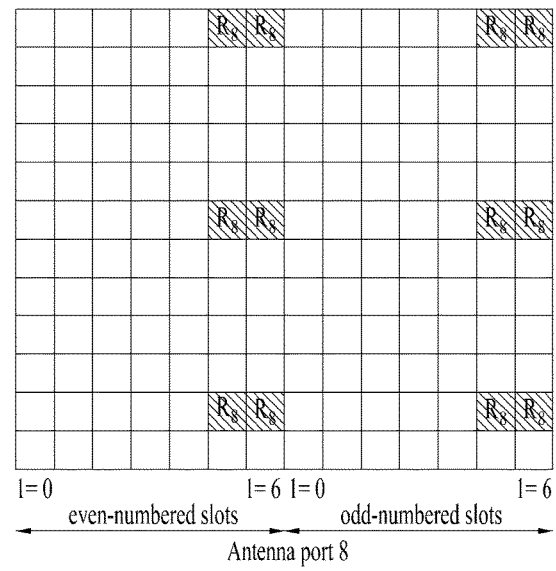
Antenna port 8
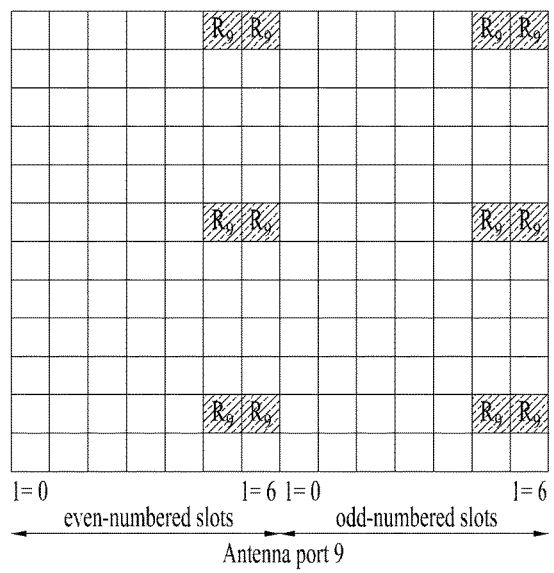
Antenna port 9
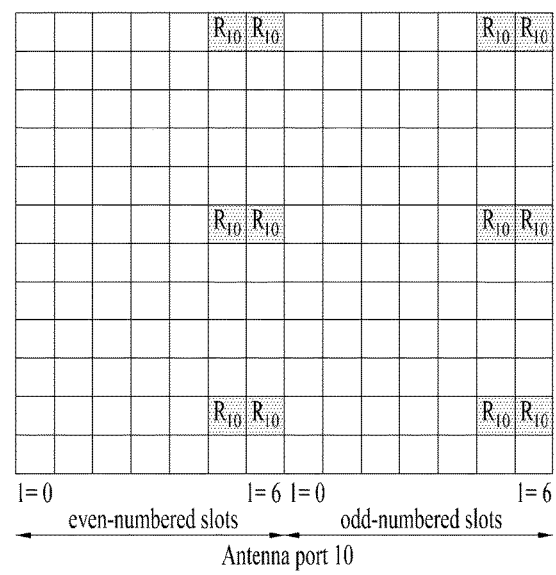
Antenna port 10

METHOD FOR RECEIVING OR TRANSMITTING DOWNLINK CONTROL SIGNAL IN WIRELESS COMMUNICATION SYSTEM AND DEVICE FOR SAME

CROSS REFERENCE TO RELATED APPLICATIONS

This application is the National Phase of PCT International Application No. PCT/KR2013/008478, filed on Sep. 23, 2013, which claims priority under 35 U.S.C. 119(e) to U.S. Provisional Application No. 61/704,552, filed on Sep. 23, 2012, U.S. Provisional Application No. 61/720,381, filed on Oct. 30, 2012, and U.S. Provisional Application No. 61/721,011, filed on Oct. 31, 2012, all of which are hereby expressly incorporated by reference into the present application.

TECHNICAL FIELD

The present invention relates to a wireless communication system, and more particularly, to a method of transmitting and receiving a downlink control signal in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Problem

One object of the present invention is to propose a method of transmitting and receiving downlink control information supporting carrier aggregation and coordinated multiple transmission and reception scheme at the same time in a wireless communication system.

Another object of the present invention is to propose a method of indicating that quasi co-located assumption is possible between specific antenna ports in response to a carrier aggregated scheduled element carrier and/or a method of indicating PDSCH RE mapping.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a downlink control signal, which is received by a user equipment in a wireless communication system supporting CA (carrier aggregation) and CoMP (coordinated multiple-point transmission and reception), includes receiving candidate sets of control information for the CA and the CoMP from a downlink serving base station and receiving an indicator indicating one of the candidate sets from the downlink serving base station. In this case, the candidate sets of the control information includes a set of control information available for each carrier and the control information can include at least one of information on a carrier scheduled by the downlink serving base station, information on a channel state information-reference signal antenna port(s) which is(are) QCL (quasi co-located) assumption with a demodulation-reference signal antenna port(s) of the downlink serving base station, information on PDSCH RE (resource element) mapping and information indicating whether the channel state information-reference signal antenna port(s) is(are) QCL assumable with antenna port(s) indicated by the information on the PDSCH RE mapping.

Preferably, the indicator may correspond to a value of a specific field of a DCI (downlink control information) format or a combination of values of at least two or more specific fields.

Preferably, if specific fields of the DCI format are combined with each other, at least one field of the specific fields may indicate information different from information originally indicated by the at least one field.

Preferably, the specific field may correspond to a carrier indicator field.

Preferably, one of the at least two or more specific fields may correspond to a scrambling identity field.

Preferably, if a carrier indicated by the control information does not support the CoMP operation, the control information may include information on the carrier only.

Preferably, the information indicating whether the channel state information-reference signal antenna port(s) is(are) QCL assumable with the antenna port(s) indicated by the information on the PDSCH RE mapping may be used when a downlink signal is received from the downlink serving cell.

Preferably, a set of the control information on the each carrier may be identical to each other.

Preferably, the candidate sets of the control information can be semi-statically indicated via upper layer signaling.

To further achieve these and other advantages and in accordance with the purpose of the present invention, according to one embodiment, a user equipment configured to receive a downlink control signal in a wireless communication system supporting CA (carrier aggregation) and CoMP (coordinated multiple-point transmission and reception) includes an RF (radio frequency) unit and a processor configured to control the RF unit, the processor configured to receive candidate sets of control information for the CA and the CoMP from a downlink serving base station, the processor configured to receive an indicator indicating one of the candidate sets from the downlink serving base station. In this case, the candidate sets of the control information include a set of control information available for each carrier and the control information can include at least one selected from the group consisting of information on a carrier scheduled by the downlink serving base station, information on a channel state information-reference signal antenna port(s) which is(are) QCL (quasi co-located) assumable with a demodulation-reference signal antenna port(s) of the downlink serving base station, information on PDSCH RE (resource element) mapping and information indicating whether the channel state information-reference signal antenna port(s) is(are) QCL assumable with antenna port(s) indicated by the information on the PDSCH RE mapping.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, the present invention can more efficiently support carrier aggregation and coordinated multiple transmission and reception scheme at the same time in a wireless communication system.

According to one embodiment of the present invention, since quasi co-located (QCL) assumption is possible between specific antenna ports in response to a plurality of carriers, if characteristics of a specific antenna port are tracking, the characteristics of the specific antenna port can be used for demodulating/decoding a downlink signal, thereby enhancing processing capability of a receiver.

According to one embodiment of the present invention, since information on resource mapping is indicated in consideration of a specific antenna port, it is able to more efficiently demodulate/decode a downlink signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram for a mapping pattern of a demodulation reference signal according to an antenna port;

BEST MODE

Figure 1:
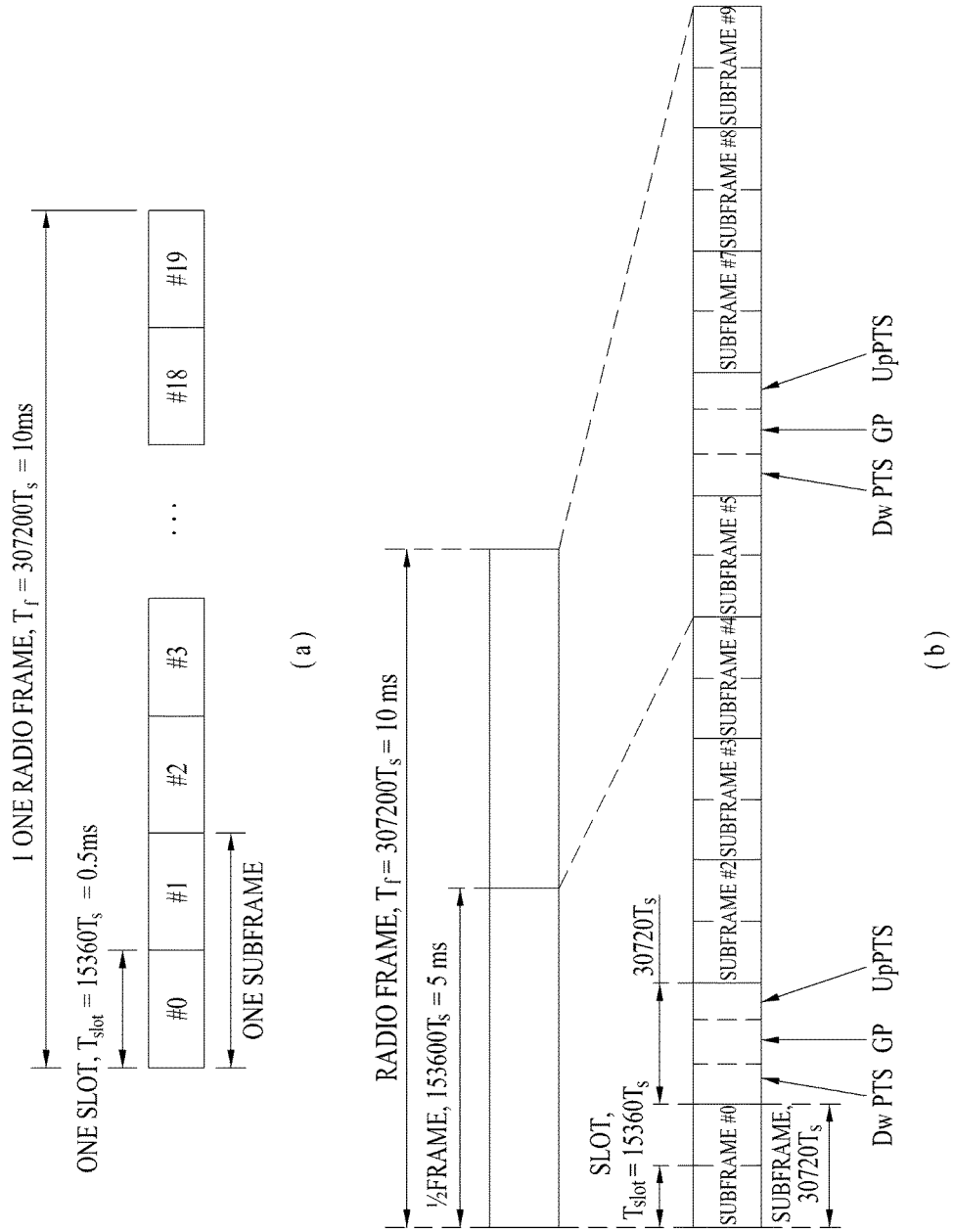
FIG. 1 is a diagram for an example of a radio frame structure used in wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as $T_s=1/(2048*15 \text{ kHz})$. Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 5 | $6592 \cdot T_s$ | $4384 \cdot T_s$ | $5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | — | — | — |
| 8 | $24144 \cdot T_s$ |  |  | — | — | — |

Figure 2:
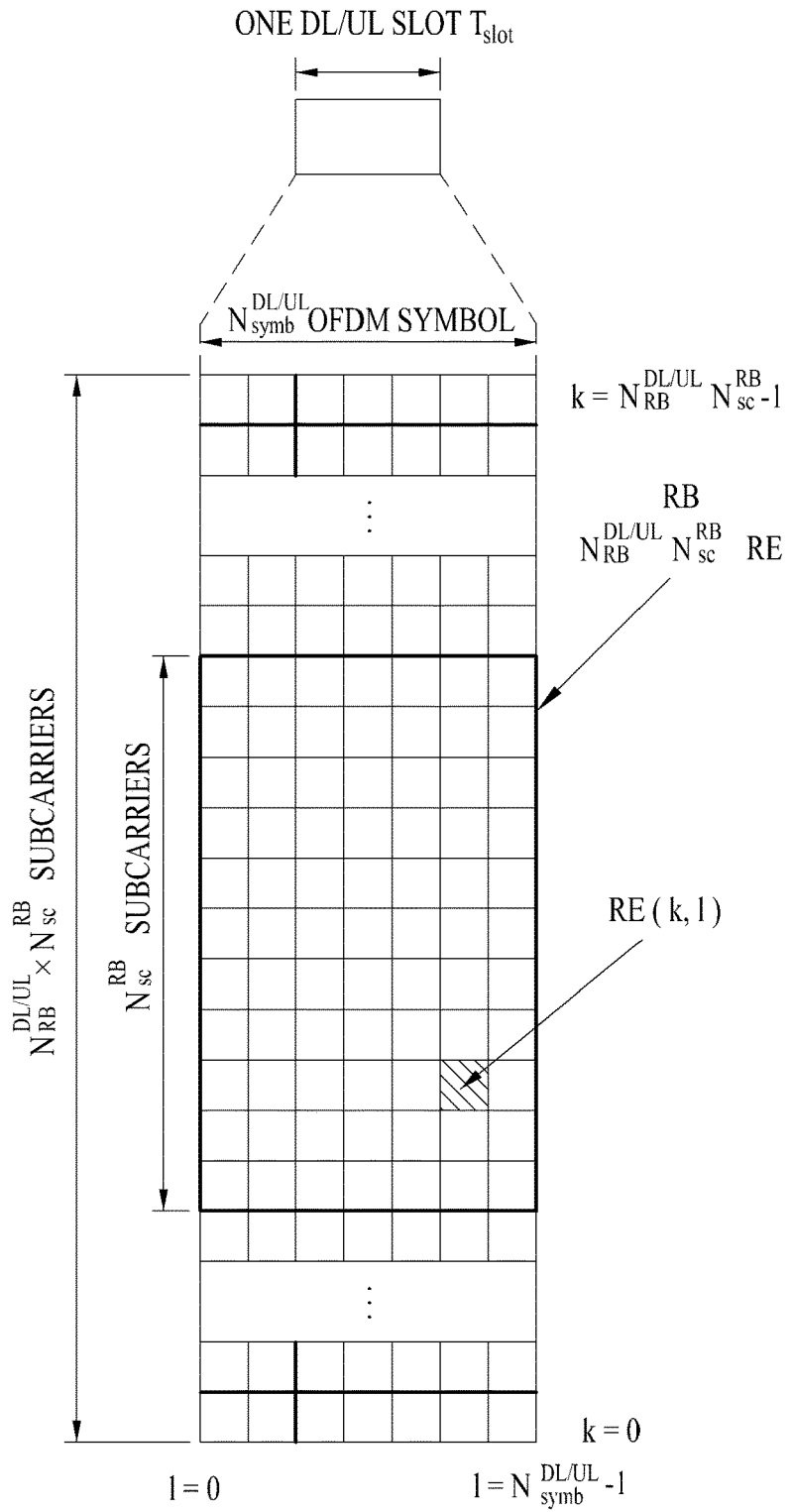
FIG. 2 is a diagram for an example of a downlink (DL)/uplink (UL) slot structure in wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
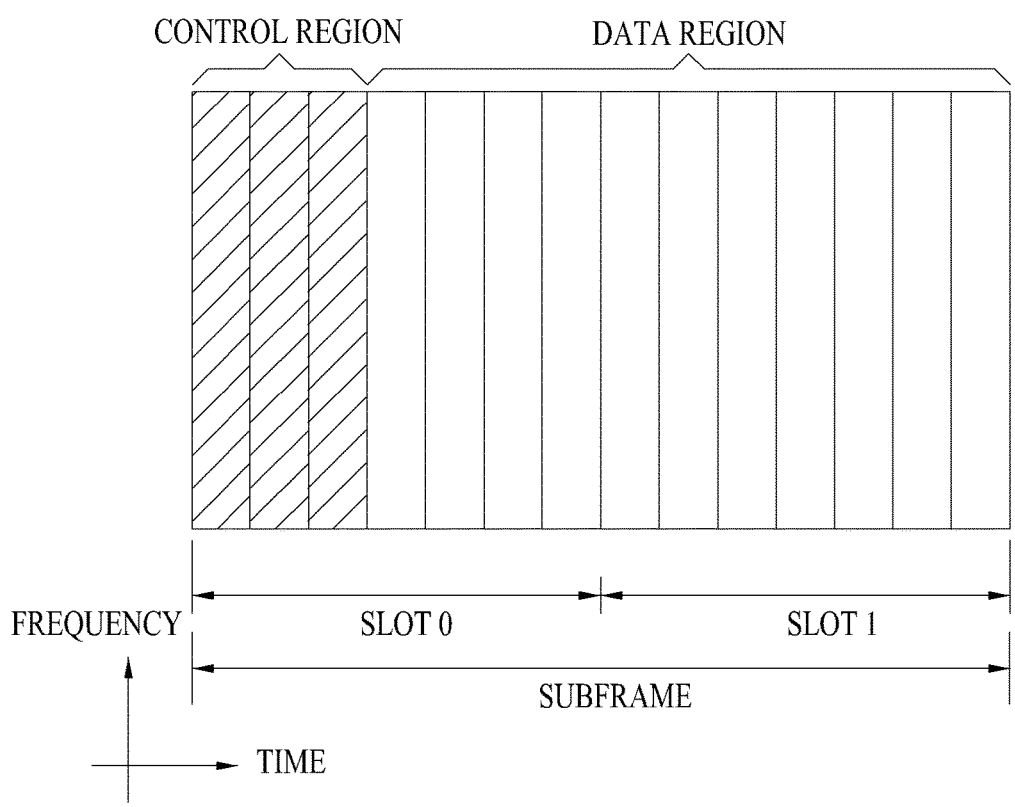
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
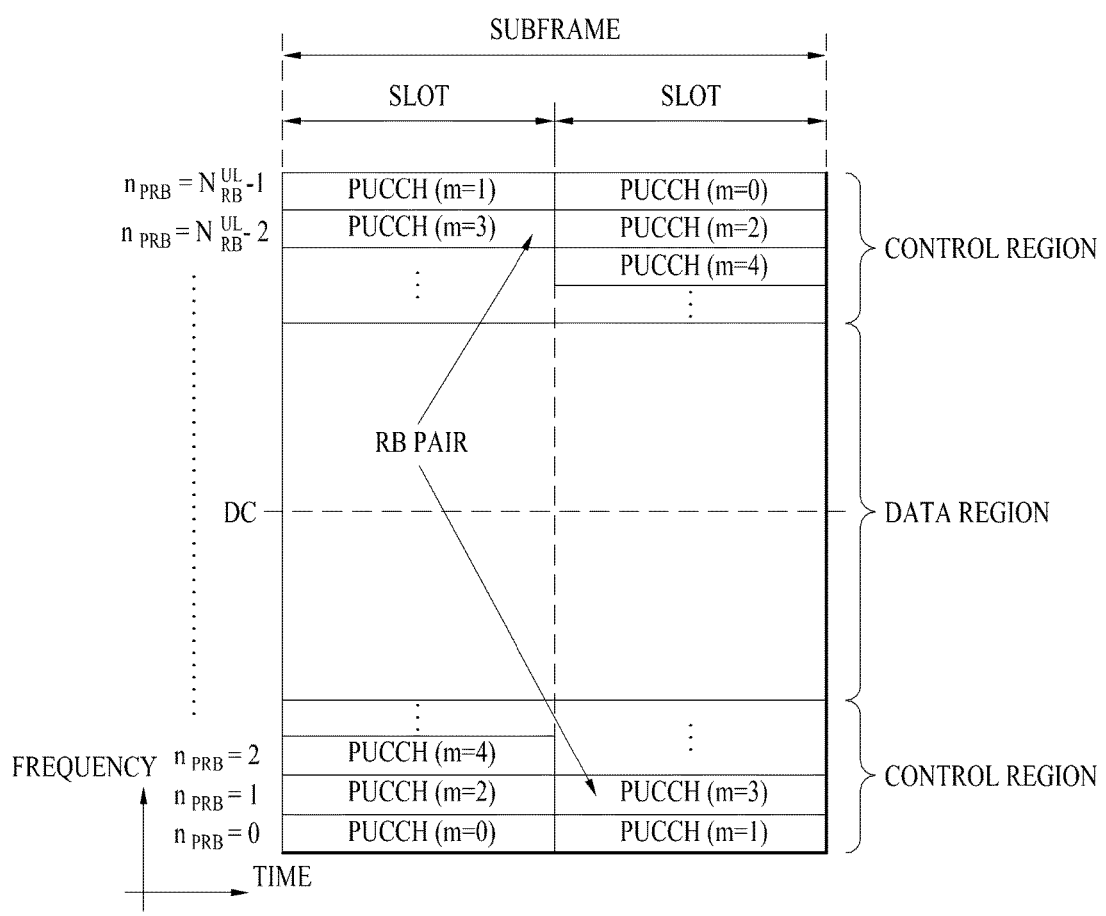
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
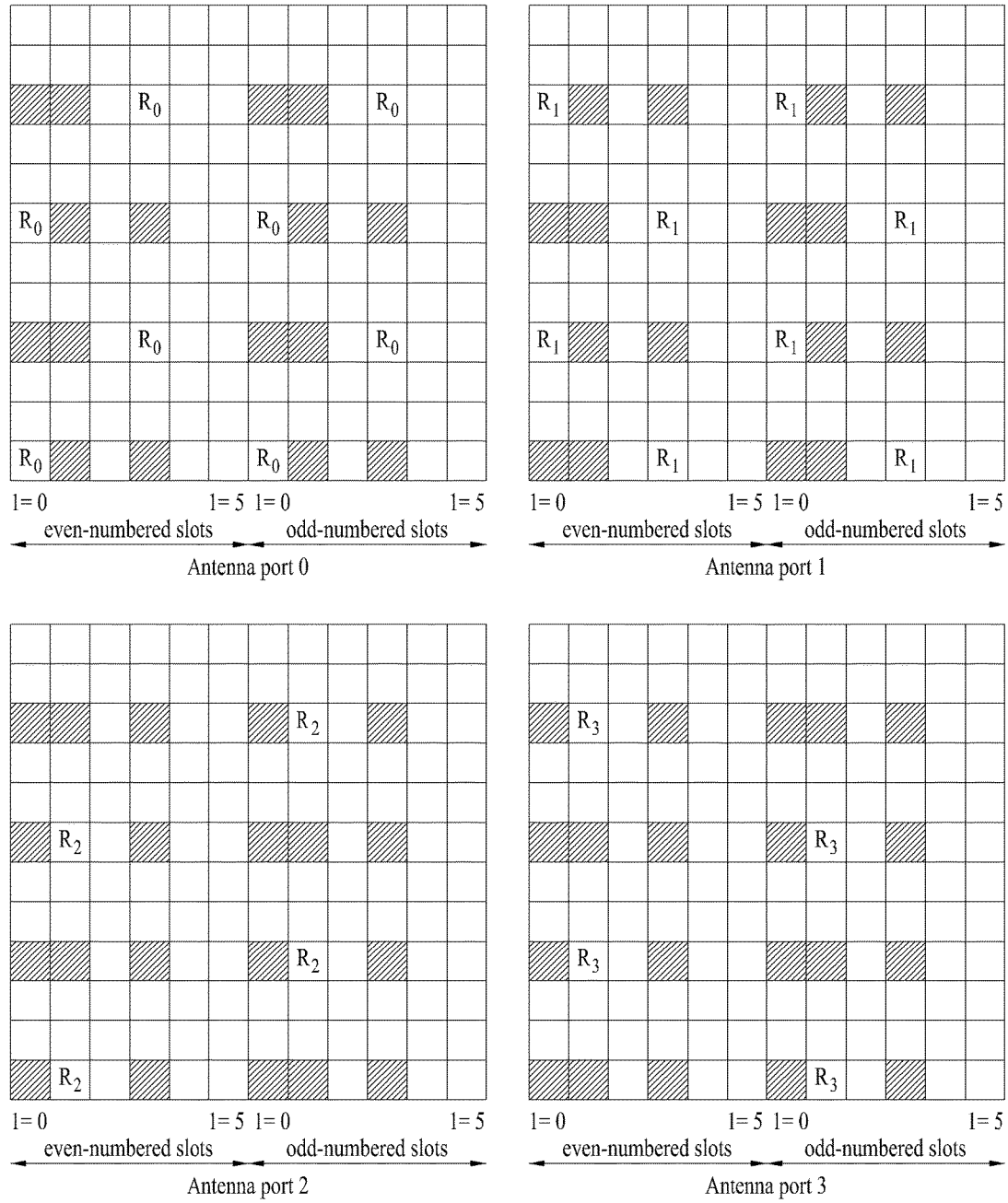
FIG. 5 is a diagram for a mapping pattern of a cell-specific reference signal according to an antenna port.

FIG. 5 illustrates cell specific reference signal (CRS) mapping patterns according to antenna ports. The CRS is used for obtaining channel information and demodulating data, a UE-specific reference signal is used for demodulating data. The CRS is transmitted for wideband in every subframe, and the reference signal for up to four (4) antenna ports is transmitted according to the number of the transmission antennas of the eNB.

For example, if the number of the transmission antennas of the eNB is two, the CRS for #0 and #1 antenna ports is transmitted and if the number of the transmission antennas of the eNB is four, the CRS for #0 to #3 antenna ports is transmitted.

FIG. 6 illustrates demodulation reference signal mapping patterns according to antenna ports. A DMRS is a reference signal defined for a UE to perform channel estimation with respect to a PDSCH. The DMRS can be used in transmission modes 7, 8 and 9. The DMRS was initially defined for single layer transmission of antenna port #5 and then extended for spatial multiplexing of a maximum of 8 layers. The DMRS, which is also called a UE specific reference signal, is transmitted for a specific UE only and thus can be transmitted in an RB through which a PDSCH for the specific UE is transmitted.

Description will be given of generation of a DMRS for a maximum of 8 layers. With regard to the DMRS, a reference signal sequence r(m) generated according to Equation 1 can be mapped to complex-valued modulation symbols $a_{k,l}^{(p)}$ according to Equation 2 and transmitted. FIG. 6 illustrates mapping of the DMRS to a resource grid in a subframe with respect to antenna ports 7 to 10 in the normal CP case.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

Here, r(m) denotes the reference signal sequence, c(i) denotes a pseudo random sequence and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m')$$

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9} \\ l' \bmod 2 + 2 + 3\left\lfloor\frac{l'}{2}\right\rfloor & \text{if in a special subframe with configuration 1, 2, 6 or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6 or 7} \\ 0, 1 & \text{if } n_s \bmod 2 = 0 \text{ and not in special subframe with configuration 1, 2, 6 or 7} \\ 0, 1 & \text{if } n_s \bmod 2 = 1 \text{ and not in special subframe with configuration 1, 2, 6 or 7} \end{cases}$$

$$m' = 0, 1, 2$$

As represented in Equation 2, when the reference signal sequence is mapped to complex-valued modulation symbols, an orthogonal sequence $\overline{w}_p(i)$ is applied according to antenna port, as shown in Table 5.

TABLE 5

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Figure 7:
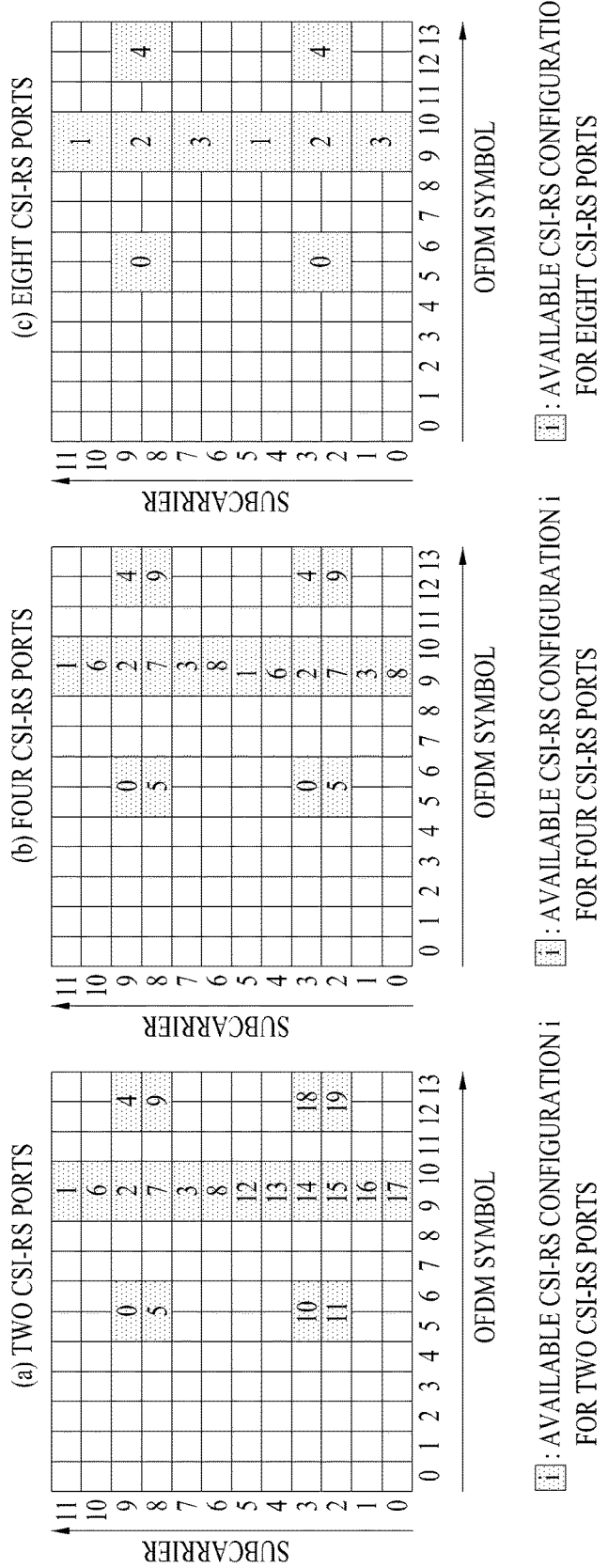
FIG. 7 is a diagram for a mapping pattern of a channel state information reference signal according to an antenna port.

FIG. 7 illustrates CSI-RS mapping patterns according to antenna ports. An antenna port for CSI-RS transmission is referred to as a CSI-RS port and positions of resources in a predetermined resource region, in which CSI-RSs are transmitted through CSI-RS ports corresponding thereto, are referred to as a CSI-RS pattern or CSI-RS resource configuration. In addition, a time-frequency resource to/through which a CSI-RS is allocated/transmitted is referred to as a CSI-RS resource. For example, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15,16, p=15, . . . , 18 and p=15, . . . , 22), distinguished from the CRS, and is defined for Δf=15 kHz only. Antenna ports p=15, . . . , 22 may respectively correspond to CSI-RS ports p=0, . . . , 7 in the following description.

Tables 6 and 7 show CSI-RS configurations that can be used in a frame structure (referred to as FS-1 hereinafter) for FDD (frequency division duplex) and a frame structure (referred to as FS-2 hereinafter) for TDD (time division duplex). Particularly, Table 6 shows CSI-RS configurations in a subframe having the normal CP and Table 7 shows CSI-RS configurations in a subframe having the extended CP.

TABLE 6

| | | Number of CSI-RSs configured | | | | |
|---|---|---|---|---|---|---|
| CSI-RS | | 1 or 2 | | 4 | | 8 |
| configuration | (k', l') | $n_s$mod2 | (k', l') | $n_s$mod2 | (k', l') | $n_s$mod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |

TABLE 6-continued

|  | CSI-RS configuration | Number of CSI-RSs configured | | | | | |
|---|---|---|---|---|---|---|---|
|  |  | 1 or 2 | | 4 | | 8 | |
|  |  | (k', l') | $n_s$mod2 | (k', l') | $n_s$mod2 | (k', l') | $n_s$mod2 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| FS-2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 7

|  | CSI-RS configuration | Number of CSI-RSs configured | | | | | |
|---|---|---|---|---|---|---|---|
|  |  | 1 or 2 | | 4 | | 8 | |
|  |  | (k', l') | $n_s$mod2 | (k', l') | $n_s$mod2 | (k', l') | $n_s$mod2 |
| FS-1 and FS-2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| FS-2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

When (k', l') (k' being a subcarrier index in a resource block and l' being an OFDM symbol index in a slot) in Tables 5 and 6 and $n_s$ ($n_s$ being a slot index in a frame) are applied to the following equation, a time-frequency resource used by each CSI-RS port to transmit a corresponding CSI-RS can be determined. That is, a CSI-RS sequence may be mapped to complex-valued modulation symbols used as reference symbols for CSI-RS port p in slot $n_s$ in a subframe (CSI-RS subframe) configured for CSI-RS transmission according to the following equation.

$$a_{k,l}^{(p)} = w_{l''} \cdot r_{l,n_s}(m') \qquad \text{[Equation 3]}$$

In Equation 3, a resource index pair (k, l) (k being a subcarrier index and l being an OFDM symbol index in a subframe) used for CSI-RS port p for CSI-RS transmission can be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases} \qquad \text{[Equation 4]}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

FIG. 7 illustrates CSI-RS configurations. Particularly, FIG. 7 illustrates CSI-RS configurations according to Equation 3 and Table 6 and shows positions of resources occupied by CSI-RSs in one RB pair in each CSI-RS configuration.

FIG. 7(a) shows 20 CSI-RS configurations available for CSI-RS transmission through 2 CSI-RS ports, FIG. 7(b) shows 10 CSI-RS configurations available for CSI-RS transmission through 4 CSI-RS ports and FIG. 7(c) shows 5 CSI-RS configurations available for CSI-RS transmission through 8 CSI-RS ports. CSI-RS configurations defined on the basis of the number of CSI-RS ports may be numbered.

When a BS sets 2 antenna ports for CSI-RS transmission, that is, sets 2 CSI-RS ports, CSI-RS transmission is performed in a radio resource corresponding to one of the 20 CSI-RS configurations, shown in FIG. 7(a), through the 2 CSI-RS ports. When 4 CSI-RS ports are set for a specific cell, CSI-RSs are transmitted in resources corresponding to CSI-RS configurations for the specific cell from among the 10 CSI-RS configurations, shown in FIG. 7(b), through the 4 CSI-RS ports. When 8 CSI-RS ports are set for the specific cell, CSI-RSs are transmitted in resources corresponding to CSI-RS configurations for the specific cell from among the 5 CSI-RS configurations, shown in FIG. 7(c), through the 8 CSI-RS ports.

CSI-RS configurations shown in Tables 6 and 7 have a nested property. The nested property means that a CSI-RS configuration for a large number of CSI-RS ports becomes a super set of a CSI-RS configuration for a small number of CSI-RS ports. Referring to FIGS. 7(b) and 7(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs. For example, with regard to a radio frame for TDD, a CSI-RS is not transmitted in a special subframe in which downlink transmission and uplink transmission coexist, a subframe in which a paging message is transmitted and a subframe in which transmission of a synchronization signal, a physical broadcast channel (PBCH) or system information block type 1 (SIB1) collide with a CSI-RS, and the UE assumes that a CSI-RS is not transmitted in these subframes. A time-frequency resource used for a CSI-RS port to transmit the corresponding CSI-RS is not used for PDSCH transmission through any antenna port and is not used for CSI-RS transmission through an antenna port other than the corresponding CSI-RS port.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per subframe. In this case, CSI-RS transmission overhead can be remarkably reduced compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 8 shows CSI-RS transmission periodicity $T_{CSI-RS}$ and subframe offset $\Delta C_{CSI-RS}$.

TABLE 8

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
|---|---|---|
| $I_{CSI-RS} \leq 4$ | 5 | $I_{CSI-RS}$ |
| $5 \leq I_{CSI-RS} \leq 14$ | 10 | $I_{CSI-RS} - 5$ |
| $15 \leq I_{CSI-RS} \leq 34$ | 20 | $I_{CSI-RS} - 15$ |
| $35 \leq I_{CSI-RS} \leq 74$ | 40 | $I_{CSI-RS} - 35$ |
| $75 \leq I_{CSI-RS} \leq 154$ | 80 | $I_{CSI-RS} - 75$ |

In Table 8, $I_{CSI-RS}$ specifies CSI-RS transmission periodicity and subframe offset.

The BS may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \qquad \text{[Equation 5]}$$

Here, $n_f$ denotes a system frame number and $n_s$ represents a slot number of a radio frame.

For example, referring to Table 8, when $I_{CSI-RS}$ is greater than 5 and less than 14, a CSI-RS is transmitted every 10 subframes, starting from a subframe corresponding to a subframe number $I_{CSI-RS}$-5.

The BS may notify the UE of the following parameters through higher layer signaling (e.g. medium access control (MAC) signaling or radio resource control (RRC) signaling).

Number of CSI-RS ports
CSI-RS configuration (refer to Tables 5 and 6, for example)
CSI-RS subframe configuration (refer to Table 7, for example)
CSI-RS subframe configuration periodicity $T_{CSI-RS}$
CSI-RS subframe offset $\Delta_{CSI-RS}$ The BS may notify the UE of a CSI-RS configuration transmitted with zero power and a subframe configuration for transmission of a zero power CSI-RS as necessary. The CSI-RS configurations of Tables 6 and 7 may be used as the zero power CSI-RS configuration and the CSI-RS subframe configuration of Table 8 may be used as the subframe configuration for transmission of the zero power CSI-RS.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Carrier Aggregation

Figure 8:
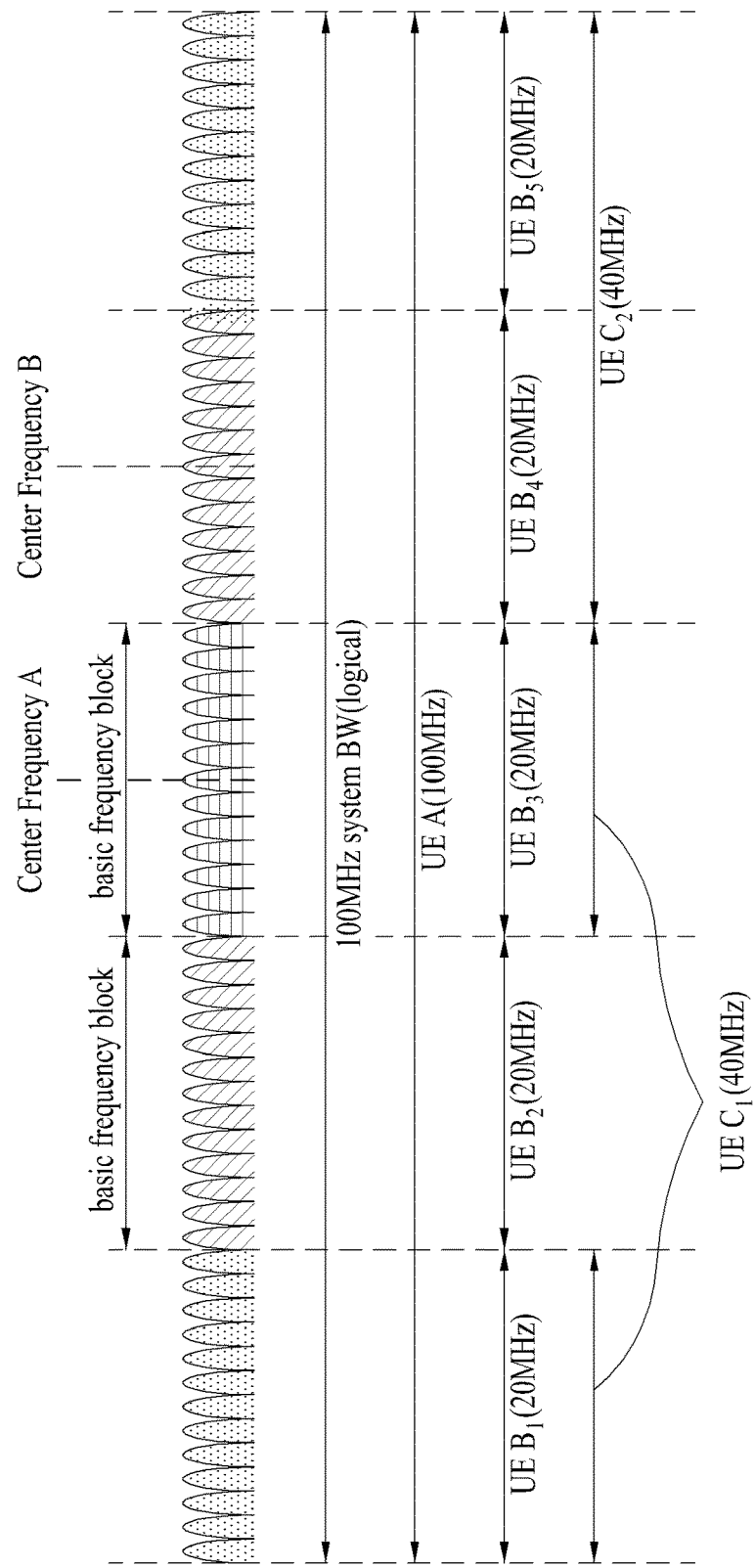
FIG. 8 is a conceptual diagram for explaining a carrier aggregation (CA) scheme.

Carrier aggregation will be described below. FIG. 8 is a conceptual diagram of carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Figure 11:
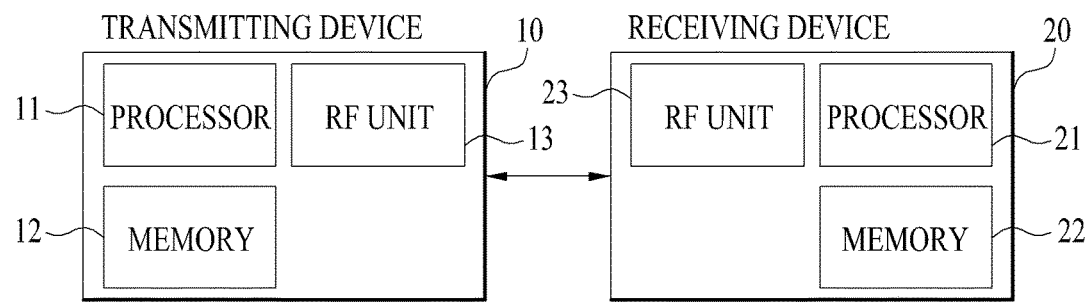
FIG. 11 is a block diagram for a device configured to implement embodiment(s) of the present invention.

Referring to FIG. 8, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 11, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 8, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous. The UE $C_1$ uses two non-contiguous CCs and the UE $C_2$ uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling (CCS) method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 9:
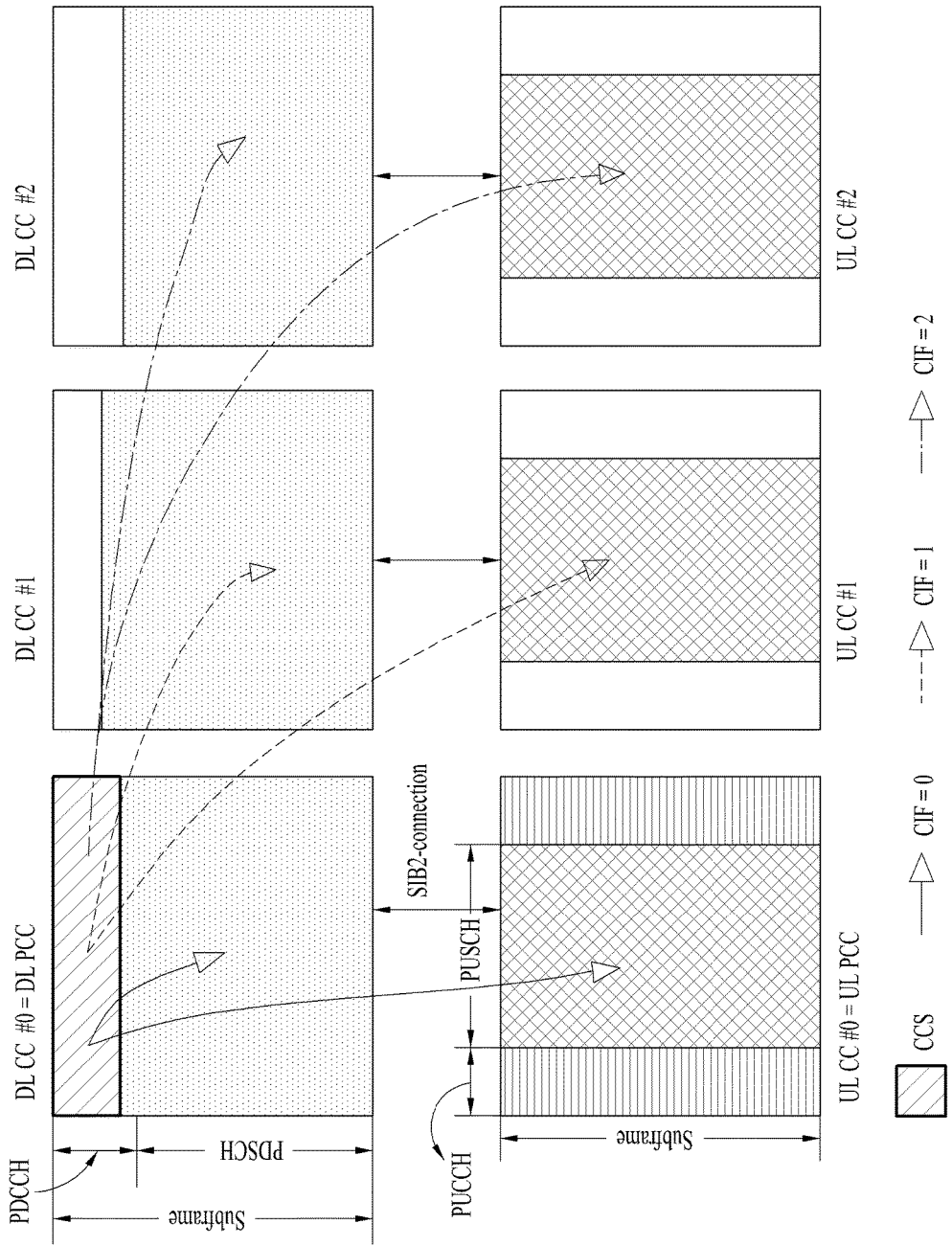
FIG. 9 is a diagram for an example to which a cross carrier scheduling scheme is applied.

FIG. 9 is a conceptual diagram of a cross carrier scheduling scheme. Specifically, as can be seen from FIG. 9, the number of cells (or CCs) allocated to a relay node (RN) is set to 3, cross carrier scheduling is carried out using a CIF as described above. In this case, it is assumed that a downlink cell (or CC) #A is set to a primary downlink CC (i.e., a primary cell PCell), and the remaining CCs #B and #C are used as secondary cells (SCells).

Quasi Co-located (QCL)

Figure 10:
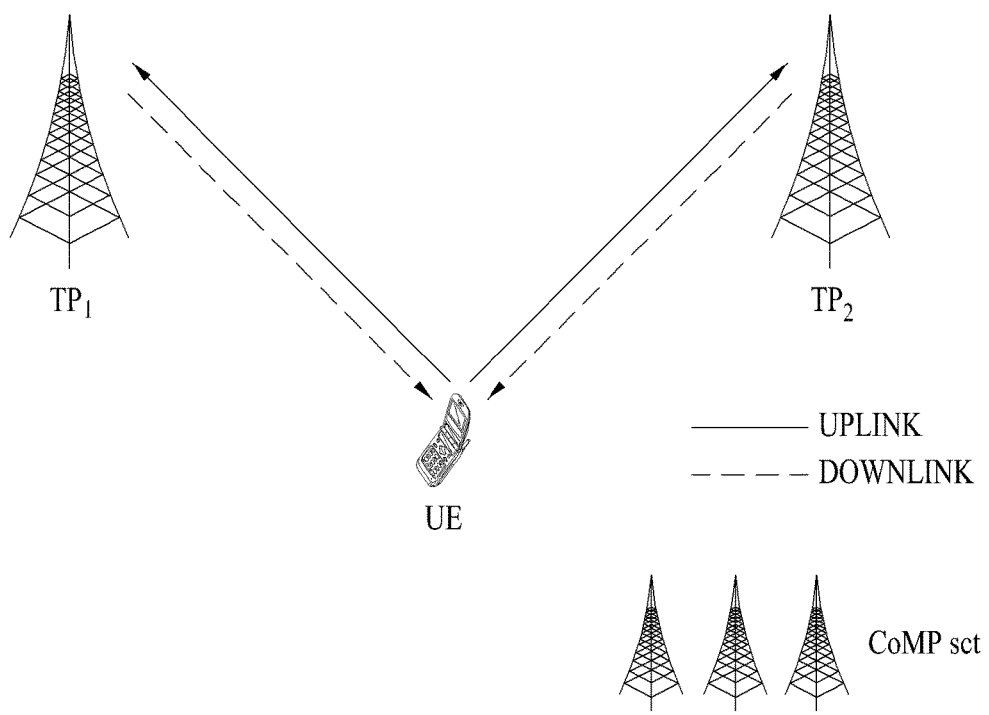
FIG. 10 is a diagram for an example of coordinated multipoint transmission and reception operation.

FIG. 10 is a diagram illustrating a wireless communication system in which a UE is served with a joint transmission (JT) service from a CoMP set. That is, FIG. 10 illustrates an example in which the UE is configured in transmission mode 10.

In FIG. 10, the UE may receive data all transmission points (TPs) belonging to the CoMP set, for example, TP1 and TP2 and thus transmit channel state information about the all TPs belonging to the CoMP set. In this case, RSs may also be transmitted to the UE from a plurality of TPs in the CoMP set. In this case, when characteristics for channel estimation from different RS ports of different TPs can be shared, the load and complexity of receiving processing of the UE can be lowered. In addition, when characteristics for channel estimation from different RS ports of the same TP can be shared between RS ports, the load and complexity of receiving processing of the UE can be lowered. Accordingly, the current LTE(-A) system proposes a method for sharing characteristics for channel estimation between RS ports.

For channel estimation between RS ports, the LTE(-A) system introduces the concept of "quasi co-located (QCL)". For example, in the case of two antenna ports, when the large-scale property of a radio channel for transmitting one symbol through one antenna port can be inferred from a radio channel for transmitting one symbol through the other antenna, it can be said that the two antenna ports are quasi co-located. Here, the large-scale property includes one or more of delay spread, Doppler spread, Doppler shift, average gain, and average delay. Hereinafter, the quasi co-located will be simply referred to as QCL.

That is, when two antenna ports are QCL, it can be said that the large-scale property of a radio channel from one antenna port is the same as the large-scale property of a radio channel from the other antenna port. In consideration of a plurality of antenna ports for transmission of a reference signal (RS), when antenna ports for transmitting different types of RSs are QCL, the large-scale property of a radio channel from one type of antenna port can be replaced with the large-scale property of a radio channel from the other type of antenna port.

According to the concept of the QCL, for non-QCL antenna ports, the UE cannot assume the same large-scale property between radio channels from the corresponding antenna ports. That is, in this case, the UE needs to perform independent processing for each non-QCL antenna port configured for timing acquisition and tracking, frequency offset estimation and compensation, delay estimation and Doppler estimation, etc.

It is advantageous that the UE can perform the following operation between antenna ports that can be assumed to be QCL:

For delay spread and Doppler spread, the UE can also apply results of power-delay-profile, delay spread and Doppler spectrum, and Doppler spread estimation for a radio channel from any one of the antenna ports to a Wiener filter used in channel estimation for a radio channel from the other antenna port in the same way.

For frequency shift and reception timing, the UE can perform time and frequency synchronization on any one of the antenna ports and then apply the same synchronization to demodulation to the other antenna port.

For average reception power, the UE can average measurement of reference signal received power (RSRP) for two or more antenna ports.

Upon receiving specific DMRS-based DL-related DCI format through a control channel (PDCCH or ePDCCH), the UE performs channel estimation on the corresponding PDSCH through a DMRS sequence and then performs data demodulation. For example, when the UE can assume that antenna ports (hereinafter, referred to as a "DMRS port") for transmission of a DMRS from the DL scheduling grant is configured to be QCL with antenna ports (hereinafter, referred to as a "CRS port") for transmission of a CRS of a DL serving cell or another cell of the UE, the UE can apply an estimated value of the large-scale property of a radio channel estimated from the CRS port during channel estimation through the corresponding DMRS port without change so as to enhance the performance of a processor of a DMRS-based receiver.

As described above, this is because a CRS is an RS that is broadcast with a relatively high density at every subframe and over all bands, and thus an estimated value for the large-scale property can be stably acquired from the CRS in general. On the other hand, since a DMRS is UE-specifically transmitted for a specifically scheduled RB and a precoding matrix used for transmission in a PRG unit by an eNB can be changed, an effective channel received by a UE can be varied in a PRG unit, and thus even if a plurality of PRGs is scheduled, performance degradation may occur when the DMRS is used for estimation of the large-scale property of a radio channel over a wide band. Since the CSI-RS has a transmission period of several to several tens of ms and a low density of average of 1 RE (2RE as a reception unit when CDM is applied) for each antenna port per RB, performance degradation may also occur when the CSI-RS is used for estimation of the large-scale property of the radio channel.

That is, the QCL assumption between antenna ports can be used for channel state report, channel estimation, and reception of various downlink reference signals.

The present invention intends to propose a method of signaling a downlink control signal transmitted to a UE in a manner of combining a plurality of information with each other in a wireless communication system supporting CoMP and CA at the same time.

For instance, as shown in Table in the following, a system or an eNB can transmit a downlink control signal to a UE.

TABLE 9

| state | QCL assumption with CSI-RS | RM pattern information | Flag for QC assumption with CRS | Interpretation |
|---|---|---|---|---|
| '00' | CSI-RS1 | CRS-RM4 (e.g., PCM) | 0 | Since flag corresponds to '0', there is no CRS ports capable of being assumed with CSI-RS 1 (i.e., NQC) |
| '01' | CSI-RS2 | CRS-RM4 (e.g., PCM) | 0 | Since flag corresponds to '0', there is no CRS ports capable of being assumed with CSI-RS1 (i.e., NQC) |
| '10' | CSI-RS3 | CRS-RM3 (e.g., PCI3) | 1 | Since flag corresponds to '1', QC assumption between CSI-RS3 and PCI3-based CRS ports is possible |
| '11' | CSI-RS1, CSI-RS2 | No-CRS (i.e., MBSFN) | 0 | Since flag corresponds to '0', there is no CRS ports capable of being assumed with CSI-RS1 and CSI-RS2 (i.e., NQC) |

In particular, a system or an eNB semi-statically configures information on a CSI-RS antenna port where QCL with a DMRS antenna port of a downlink serving cell is possible, PDSCH RE mapping information and the like as multiplexed states via RRC signaling in advance and may be able to dynamically indicate one of the states when scheduling grant is given to a serving UE via DCI.

In Table 9, "QC assumption with CSI-RS" corresponds to information on a CSI-RS port where QCL assumption is possible with a DMRS antenna port of a serving cell of the UE, "RM pattern information" corresponds to PDSCH RE mapping, i.e., RM pattern information and "Flag for QC assumption with CRS" corresponds to information indicating whether additional QCL assumption is available between a CRS port indicated by the "RM pattern information" and a CSI-RS port indicated by the "QC assumption with CSI-RS". For instance, if the "Flag for QC assumption with CRS" corresponds to '1', it indicates that QCL assumption is possible between the two ports. On the contrary, if the "Flag for QC assumption with CRS" corresponds to '0', it indicates that QCL assumption is not possible between the two ports. And, the "Flag for QC assumption with CRS" can be more usefully utilized when the UE receives downlink data from a DL serving cell. Density of a CRS is relatively higher than density of a different RS and a CRS is transmitted in every subframe. Since the UE measures a CRS received from the DL serving cell, if the "Flag for QC assumption with CRS" indicates '1', the UE can use a wide band characteristic based on the previously measured CRS antenna port for the CSI-RS antenna port. Hence, processing load of the UE can be reduced and power consumption and time resource can be saved.

Meanwhile, a first column of Table 9, i.e., a "state" field requires 2 bits to indicate 4 rows of the "state" field. To this end, it may reuse a specific bit within a DCI format or may consider adding a new field. Regarding this, it shall be described with reference to embodiments of the present invention in the following.

It may consider a wireless communication system in which a CoMP operation and a CA operation are supported at the same time. In this case, a CIF (carrier indicator field) can be utilized to indicate a specific carrier. In particular, various informations mentioned earlier in Table 9 can be provided in a manner of being combined with the CIF. Basically, scheduled $CC_k$ information indicating a CC scheduled among $CC_0$, $CC_1$, ..., $CC_k$ (e.g., k=5) should be mapped to each state. In addition to the scheduled $CC_k$ information, if it is necessary to indicate CoMP scheduling in the $CC_k$, such signaling information for CoMP mentioned earlier in $2^N$ number of states in Table 9 as information on whether the QCL is possible, PDSCH RE mapping information and the like can be configured via additional RRC. In particular, in case of a CC to which a CoMP operation is not applied, similar to a legacy CIF, scheduled $CC_k$ information is RRC configured to a corresponding state only. On the contrary, in case of a CC to which a CoMP operation is applied, not only scheduled $CC_k$ information but also information on a CoMP operation, which is to be applied on the $CC_k$, can be RRC configured. By doing so, control signaling for a case of supporting CA and CoMP at the same time can be supported.

Table 10 in the following shows the aforementioned example.

TABLE 10

| state | Scheduled CC | QC assumption with CSI-RS | RM pattern information | Flag for QCL assumption with CRS |
|---|---|---|---|---|
| '000' | $CC_0$ | CSI-RS1 | CRS-RM1 (e.g., PCI1) | 1 |
| '001' | $CC_0$ | CSI-RS2 | CRS-RM2 (e.g., PCI2) | 1 |
| '010' | $CC_0$ | CSI-RS3 | CRS-RM3 (e.g., PCI3) | 0 |
| '011' | $CC_0$ | CSI-RS1, CSI-RS2 | CRS-RM1 (e.g., PCI1), CRS-RM2 (e.g., PCI2) | 1 |
| '100' | $CC_1$ | | | |
| '101' | $CC_2$ | | | |
| '110' | $CC_3$ | | | |
| '111' | $CC_4$ | | | |

Table 10 shows an example of 3-bit signaling identical to a CIF and a legacy CIF (3 bits) can be reused by utilizing reserved states together. First of all, similar to content of a legacy CIF field, "scheduled CC" column can indicate a scheduling CC. Referring to Table 10, it is able to know that a $CC_0$ supports CoMP only. In particular, an example of the Table 10 shows that it is able to additionally map the aforementioned information such as QCL assumption information different from each other, PDSCH RM information and the like in a manner of assigning 4 states to the $CC_0$. For each of '100', '101', '110' and '111', CoMP-related column is not written. Instead, it is able to indicate a specific scheduled $CC_k$ not performing a CoMP operation only in a manner that scheduled CC information is configured via RRC.

Or, although the scheduled $CC_k$ does not perform a CoMP operation, it is also able to additionally perform RRC configuration on information on an RS with which QCL assumption is available, information on how to perform PDSCH RM and the like in a manner of selecting information from the aforementioned information such as specific QCL assumption information, PDSCH RM information and the like for each of the states. This sort of example is shown in Table 11 in the following.

TABLE 11

| state | Scheduled CC | QC assumption with CSI-RS | RM pattern information | Flag for QCL assumption with CRS |
|---|---|---|---|---|
| '000' | $CC_0$ | CSI-RS1 | CRS-RM1 (e.g., PCI1) | 1 |
| '001' | $CC_0$ | CSI-RS2 | CRS-RM2 (e.g., PCI2) | 1 |
| '010' | $CC_0$ | CSI-RS3 | CRS-RM3 (e.g., PCI3) | 0 |
| '011' | $CC_1$ | | | |
| '100' | $CC_2$ | CSI-RS21 | CRS-RM21 (e.g., PCI21) | 1 |
| '101' | $CC_2$ | CSI-RS22 | CRS-RM22 (e.g., PCI22) | 1 |
| '110' | $CC_3$ | | | |
| '111' | $CC_4$ | CSI-RS41 | CRS-RM41 (e.g., PCI41) | 0 |

Referring to Table 11, CoMP operation-related RRC information is configured by assigning 3 states to a $CC_0$ and CoMP operation-related RRC information is configured by assigning 2 states to a $CC_2$. According to an example shown in Table 11, a $CC_1$ and a $CC_3$ do not support a CoMP operation and only scheduled CC information can be set to the $CC_1$ and the $CC_3$. In case of a $CC_4$, although the $CC_4$ does not support a CoMP operation, specific information such as information on an RS with which QCL assumption is available, information on a PDSCH RM pattern to be applied and the like can be additionally RRC configured.

It is apparent that such embodiments as Table 10 and Table 11 are extended to more than 4 bits, more states are RRC configured and one of the states is indicated. For instance, as shown in Table 12 in the following, a legacy CIF is extended to 4 bits. Or, instead of a legacy CIF field, the 4 bits to which a different name is given can be used to support CoMP and CA at the same time.

TABLE 12

| state | Scheduled CC | QC assumption with CSI-RS | RM pattern information | Flag for QCL assumption with CRS |
|---|---|---|---|---|
| '0000' | $CC_0$ | CSI-RS1 | CRS-RM1 (e.g., PCI1) | 1 |
| '0001' | $CC_0$ | CSI-RS2 | CRS-RM2 (e.g., PCI2) | 1 |
| '0010' | $CC_0$ | CSI-RS3 | CRS-RM3 (e.g., PCI3) | 0 |
| '0011' | $CC_1$ | CSI-RS11 | CRS-RM11 (e.g., PCI11) | 1 |
| '0100' | $CC_1$ | CSI-RS12 | CRS-RM12 (e.g., PCI12) | 1 |
| '0101' | $CC_1$ | CSI-RS13 | CRS-RM13 (e.g., PCI13) | 1 |

TABLE 12-continued

| state | Scheduled CC | QC assumption with CSI-RS | RM pattern information | Flag for QCL assumption with CRS |
|---|---|---|---|---|
| '0110' | $CC_2$ | CSI-RS21 | CRS-RM21 (e.g., PCI21) | 1 |
| '0111' | $CC_2$ | CSI-RS22 | CRS-RM22 (e.g., PCI22) | 1 |
| '1000' | $CC_2$ | CSI-RS23 | CRS-RM23 (e.g., PCI23) | 1 |
| '1001' | $CC_3$ | CSI-RS31 | CRS-RM31 (e.g., PCI31) | 1 |
| '1010' | $CC_3$ | CSI-RS32 | CRS-RM32 (e.g., PCI32) | 1 |
| '1011' | $CC_3$ | CSI-RS33 | CRS-RM33 (e.g., PCI33) | 1 |
| '1100' | $CC_4$ | CSI-RS41 | CRS-RM41 (e.g., PCI41) | 1 |
| '1101' | $CC_4$ | CSI-RS42 | CRS-RM42 (e.g., PCI42) | 1 |
| '1110' | $CC_4$ | CSI-RS43 | CRS-RM43 (e.g., PCI43) | 1 |
| '1111' | reserved | reserved | reserved | reserved |

Table 12 shows an example that 3 states are assigned to each CC and information for a CoMP operation different from each other according to each state is RRC configured. Although a last state '1111' is in a reserved state, it is apparent that the state can be utilized as an additional state (e.g., JT operation) for a specific CC and the like. In the foregoing description, although couples of embodiments are explained only, the present invention can freely perform RRC configuration according to each state of DL control signaling to support CoMP and CA at the same time with a combination of various forms described in the foregoing description. A similar transformed method such as normalizing and extending a width of bits of a corresponding field to more than 5 bits also belongs to a scope of the present invention.

As a different scheme, according to the present invention, a CIF (e.g., 3 bits) for indicating a legacy scheduling CC and N bits for the aforementioned DL CoMP operation are separately configured. When the two fields are included in a specific DCI format, it is able to make a state corresponding to the independent N bits for the DL CoMP operation to be RRC configured according to an each value (state) of the CIF. Table 13 in the following shows an example of the aforementioned scheme.

TABLE 13

| state | Scheduled CC | $2^N$ state for DL CoMP operation (N = 2) | QC assumption with CSI-RS | RM pattern information | Flag for QCL assumption with CRS |
|---|---|---|---|---|---|
| '000' | $CC_0$ | '00' | CSI-RS1 | CRS-RM1 (e.g., PCI1) | 1 |
| | | '01' | CSI-RS2 | CRS-RM2 (e.g., PCI2) | 1 |
| | | '10' | CSI-RS3 | CRS-RM3 (e.g., PCI3) | 0 |
| | | '11' | CSI-RS1, CSI-RS2 | CRS-RM1 (e.g., PCI1), CRS-RM2 (e.g., PCI2) | 1 |
| '001' | $CC_1$ | | | | |
| '010' | $CC_2$ | | | | |
| '011' | $CC_3$ | '00' | CSI-RS31 | CRS-RM31 (e.g., PCI31) | 1 |
| | | '01' | CSI-RS32 | CRS-RM32 (e.g., PCI32) | 1 |

TABLE 13-continued

| state | Scheduled CC | $2^N$ state for DL CoMP operation (N = 2) | QC assumption with CSI-RS | RM pattern information | Flag for QCL assumption with CRS |
|---|---|---|---|---|---|
| | | '10' | CSI-RS33 | CRS-RM33 (e.g., PCI33) | 1 |
| | | '11' | CSI-RS31, CSI-RS32 | CRS-RM31 (e.g., PCI31), CRS-RM32 (e.g., PCI32) | 1 |
| '100' | $CC_4$ | | | | |
| '101' | reserved | | | | |
| '110' | reserved | | | | |
| '111' | reserved | | | | |

Table 13 shows an example of a case that a $CC_0$ and a $CC_3$ correspond to CCs to which a CoMP operation is applied. In this case, it is able to know that the $2^N$ number of states to be applied to the $CC_0$ and the $2^N$ number of states to be applied to the $CC_3$ are different from each other. If the $CC_0$ is scheduled by a CIF (the very left column) via RRC configuration interlocked with each of the states, among the $2^N$ number of states interlocked with each of the CIF, one of the states can be dynamically indicated. And, If the $CC_3$ is scheduled by a CIF or the like, a specific state among the $2^N$ number of states interlocked with the CIF can be dynamically indicated.

In particular, the $2^N$ numbers of states follow information interlocked with a corresponding $CC_k$ according to a scheduled CC and a state indicated among the $2^N$ number of states is dynamically indicated via the N number of separate bit fields of an identical DCI.

As shown in Table 13, in case of a CC (e.g., a $CC_1$, a $CC_2$ and a $CC_4$) to which a CoMP operation is not applied, the $2^N$ number of states may not exist. In this case, information on the N number of bit fields is meaningless. Hence, it is able to promise for a corresponding UE to ignore the information. Or, In this case, each of the $2^N$ number of states can be mapped by single identical information. In particular, if all of the N number of bits indicating the $2^N$ number of states, which are used for a CoMP operation interlocked with a specific $CC_k$ not supporting the CoMP operation, are configured by identical information, no matter what the N number of bits has a value, identical information can be indicated.

Or, when a CC to which a CoMP operation is not applied (e.g., a TM (e.g., TM10) not supporting CoMP) is indicated as a CIF, a bit field indicating the $2^N$ number of states can be fixed by such a specific state as '00'. In particular, if a legacy TM (e.g., a TM9) is set to a corresponding CC in advance instead of a TM (e.g., TM10) supporting CoMP, a UE should interpret it as the $2^N$ number of states indicate a specific state such as '00' only and the UE should operate according to the state. When the UE operates according to the state, if a state (e.g., '01') different from the specific state such as '00' is signaled, it may operates as a false alarm. In this case, since the false alarm has a sort of virtual CRC effect, it is able to detect a PDCCH error.

Or, when a CC to which a CoMP operation is not applied (e.g., a TM (e.g., TM10) not supporting CoMP) is indicated as a CIF, the N number of bit fields indicating the $2^N$ number of states may not be signaled. In particular, if a legacy TM (e.g., a TM9) is set to a corresponding CC in advance instead of a TM (e.g., TM10) supporting CoMP, a UE can configure the N number of bit fields to be omitted. In particular, a width of a corresponding DCI bit has a difference as many as the N number of bits according to whether a specific CC supports CoMP. Hence, if the specific CC does not support a CoMP operation, the width of the DCI bit is reduced as many as the N number of bits. Hence, a coding gain as many as the N number of bits can be enhanced.

Or, if a CIF (e.g., 3 bits) and the N number of bits indicating the $2^N$ number of states exist in a corresponding DCI format, no matter what CCs are indicated by the CIF, values configured via RRC for each of the $2^N$ number of states may not be changed (i.e., CC-transparent). In particular, in this case, an RRC configured parameter list (e.g., the aforementioned QCL-related information, PDSCH RM information and the like) corresponding to each of the $2^N$ number of states is CC-transparently configured. No matter what CC is indicated by the CIF, interpretation for each of the $2^N$ number of states is not changed. In order to support the aforementioned scheme, it may be able to configure an RRC configured parameter list related to a serving cell/TP to make no difference in interpreting each of the $2^N$ number of states according to each CC (e.g., in order to apply a state '00' to a non-CoMP operation as well). By doing so, a CC-transparent configuration can be enabled. In particular, in case of states '01', '10', and '11', the states can be used to indicate the RRC configured parameter list corresponding a COMP operation. Although CC indication indicated by a CIF varies, interpretation for each of the states '01', '10' and '11' may have no problem by using a scheme of aligning an index order of NZP CSI-RS configuration according to each CC and the like. To this end, there should be appropriate network implementation to support the scheme.

As a different embodiment of the present invention, in a wireless communication system to which CA and CoMP are applicable at the same time, in case of semi-statically providing a set(s) of parameters consisting of the aforementioned QCL related information, PDSCH RM information, a CC index and the like via RRC signaling and indicating a set among the sets via a specific value of DCI, an example of utilizing $n_{SCID}$ (0 or 1, i.e., 1 bit) as the specific value is explained in the following. The $n_{SCID}$ field corresponds to a scrambling identifier and a parameter used for determining an initialization value of a pseudo random sequence to generate a DMRS sequence.

In case of indicating the $2^N$ (N=2) number of states by utilizing a CIF and independent 2 bits, it may consider a method of reusing the $n_{SCID}$ for 1 bit among N=2 bits. Two Tables in the following show the aforementioned example.

TABLE 14

| CIF | CC index |
|---|---|
| '000' | $CC_0$ |
| '001' | $CC_1$ |
| '010' | $CC_2$ |
| '011' | $CC_3$ |
| '100' | $CC_4$ |
| '101' | reserved |
| '110' | reserved |
| '111' | reserved |

TABLE 15

| $n_{SCID}$ | new DCI 1 bit | 'state' |
|---|---|---|
| 0 | 0 | Set 0 |
| | 1 | Set 1 |
| 1 | 0 | Set 2 |
| | 1 | Set 3 |

In Table 15, 'state' indicates each of the states mentioned earlier in Table 9 to Table 13 and indicates a parameter set (i.e., QCL assumption related information, PDSCH RM related information and the like) corresponding to each state. For instance, each of set 0 to set 3 corresponds to a single parameter set.

Referring to Table 14 to Table 15, a CIF indicates a CC scheduled by itself and $n_{SCID}$ 1 bit and 1 bit within a new DCI format indicate the parameter set. Hence, total 4 parameter sets (the $n_{SCID}$ 1 bit and the 1 bit within the new DCI format correspond to set 0 to 4 capable of being represented by total 2 bits) may correspond to each CIF value.

And, as a different embodiment of the present invention, a method of indicating 2 states by utilizing 1 bit only corresponding to the $n_{SCID}$ without indicating the $2^N$ (N=2) number of states is proposed. According to the present embodiment, it is not necessary to have an additional bit in a DCI format. The present embodiment can be exemplified by Table 16 in the following.

TABLE 16

| $n_{SCID}$ | 'state' |
|---|---|
| 0 | Set 0 |
| 1 | Set 1 |

In the present embodiment, a CIF indicates information identical to Table 14.

As a different embodiment of the present invention, it may consider a method of utilizing total 4 bits, which are configured by combining $n_{SCID}$ 1 bit and CIF 3 bit with each other. In this case, total 16 states can be indicated. On the contrary, actually existing combination corresponds to 20 resulted from 5 CC indexes and 4 parameter sets. Hence, a partial CC index and a parameter combination may not be indicated. As a method, a CC index capable of supporting a CoMP operation is restricted to a partial CC index only and parameter set information can be provided to the partial CC index only. Table 17 in the following shows an example.

TABLE 17

| CIF | CC index | $n_{SCID}$ | 'state' |
|---|---|---|---|
| '000' | $CC_0$ | '0' | Set 0 |
|  |  | '1' | Set 1 |
| '001' | $CC_0$ | '0' | Set 2 |
|  |  | '1' | Set 3 |
| '010' | $CC_1$ | '0' | Set 0 |
|  |  | '1' | Set 1 |
| '011' | $CC_1$ | '0' | Set 2 |
|  |  | '1' | Set 3 |
| '100' | $CC_2$ | '0' | Set 0 |
|  |  | '1' | Set 1 |
| '101' | $CC_2$ | '0' | Set 2 |
|  |  | '1' | Set 3 |
| '110' | $CC_3$ | '0' | Set 0 |
|  |  | '1' | Set 1 |
| '111' | $CC_4$ | '0' | Set 0 |
|  |  | '1' | Set 1 |

Table 17 shows an example of supporting 4 parameter sets for CoMP operation to a CC index 0, 1 and 2. Among 16 states capable of being represented by total 4 bits, 12 states are assigned to 3 CCs supporting the CoMP operation. 2 states among the remaining 4 states can indicate a non-CoMP operation for the remaining 2 CCs, respectively. In this case, the remaining 2 states may be reserved or may be used by setting a state related to a CoMP operation to each corresponding CC. The total states resulted from the combination of the CIF and the $n_{SCID}$ does not need to be defined in a manner of being identical to Table 17. It may be able to assign a combination between a different CC index and a parameter set, if necessary.

Of course, the example shown in Table 17 can be extended to a case of assigning CIF 4 bits. In this case, among total 32 states capable of being represented by total 5 bits including $n_{SCID}$ 1 bit, 20 states can be assigned to 5 CCs supporting the CoMP operation and the remaining 12 states can be reserved.

Meanwhile, according to embodiment relevant to Table 17, it is able to know that information indicated by the CIF indicates information different from the information originally indicated by the CIF. In particular, although '00' of the CIF originally indicates a CC index 0, according to Table 17, it is able to know that the CIF '00' can indicate not only a CC index 0 but also a CC index 1. In particular, information used to be indicated by the CIF is not valid anymore. The CIF indicates new information in a manner of being combined with the $n_{SCID}$.

Meanwhile, each set (set 0 to set 3) corresponding to 'state' of Table 14 to Table 17 can be differently configured according to a CC index.

FIG. 13 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method of receiving a downlink control signal, which is received by a user equipment in a wireless communication system supporting carrier aggregation (CA) and coordinated multiple-point transmission and reception (CoMP), the method comprising:

receiving a plurality of parameter sets of control information for multiple component carriers (CCs) from a downlink serving base station;

receiving a downlink control information (DCI) including at least one carrier indicator field (CIF) indicating at least one CC and a parameter set indicator field indicating one of the plurality of parameter sets to be used for the indicated at least one CC from the downlink serving base station, wherein the plurality of parameter sets of the control information comprise a set of control information available for the multiple CCs, and wherein the parameter set of control information comprises at least one of information on a CC scheduled by the downlink serving base station, information on at least one channel state information-reference signal antenna port which is quasi co-located (QCL) assumable with at least one demodulation-reference signal antenna port of the downlink serving base station, information on physical downlink shared channel resource element (PDSCH RE) mapping, and information indicating whether the at least one channel state information-reference signal antenna port is QCL assumable with at least one antenna port indicated by the information on the PDSCH RE mapping; and checking whether or not the received parameter set indicator field indicates a predetermined parameter set of control information for the CC which does not support the CoMP to determine an error on the received DCI, wherein the error is determined to be on the received DCI when the received parameter set indicator field does not indicate the predetermined parameter set of control information for the CC which does not support the CoMP.

2. The method of claim 1, wherein the information indicating whether the at least one channel state information-reference signal antenna port is QCL assumable with the at least one antenna port indicated by the information on the PDSCH RE mapping is used when a downlink signal is received from the downlink serving base station.

3. The method of claim 1, wherein a parameter set of the control information on the each CC is identical to each other.

4. The method of claim 1, wherein the plurality of parameter sets of the control information are semi-statically indicated via upper layer signaling.

5. A terminal configured to receive a downlink control signal in a wireless communication system supporting carrier aggregation (CA) and coordinated multiple-point transmission and reception (CoMP), the terminal comprising:

a transmitter and a receiver; and a processor that:

controls the receiver to receive a plurality of parameter sets of control information for multiple component carriers (CCs) from a downlink serving base station, controls the receiver to receive a downlink control information (DCI) including at least one carrier indicator field (CIF) indicating at least one CC and a parameter set indicator field indicating one of the plurality of parameter sets to be used for the indicated at least one CC from the downlink serving base station, wherein the plurality of parameter sets of the control information comprise a set of control information available for the multiple CCs, and wherein the parameter set of control information comprises at least one of information on a CC scheduled by the downlink serving base station, information on at least one channel state information-reference signal antenna port which is quasi co-located (QCL) assumable with at least one demodulation-reference signal antenna port of the downlink serving base station, information on physical downlink shared channel resource element (PDSCH RE) mapping, and information indicating whether the at least one channel state information-reference signal antenna port is QCL assumable with at least one antenna port indicated by the information on the PDSCH RE mapping, and checks whether or not the received parameter set indicator field indicates a predetermined parameter set of control information for the CC which does not support the CoMP to determine an error on the received DCI, wherein the error is determined to be on the received DCI when the received parameter set indicator field does not indicate the predetermined parameter set of control information for the CC which does not support the CoMP.

* * * * *